May 28, 1963 A. B. HUBBARD 3,091,118
VORTEX FLOW CONTROL DEVICE

Filed Aug. 8, 1960 4 Sheets-Sheet 1

INVENTOR.
Albert B. Hubbard
BY
Kane, Dalsimer and
Kane

INVENTOR.
Albert B. Hubbard
BY
Kane, Dalsimer and Kane

United States Patent Office 3,091,118
Patented May 28, 1963

3,091,118
VORTEX FLOW CONTROL DEVICE
Albert B. Hubbard, Woodstock, N.Y., assignor, by mesne assignments, to Rotron Manufacturing Co., Inc., Woodstock, N.Y., a corporation of New York
Filed Aug. 8, 1960, Ser. No. 48,226
11 Claims. (Cl. 73—230)

This invention relates generally to vortex velocity meters, and more particularly to an improved means for controlling the flow of fluid into the vortex.

In a vortex velocity meter of the type shown and described in United States Letters Patents No. 2,845,798 and No. 2,906,121 there are in addition to the vortex flow essentially three fluid flow systems. The first is the main flow which is measured by the vortex. The second is a by-pass flow separated from the main flow and capable of being variably throttled for purposes of calibration. The third flow system has been termed the shunt flow and consists of the fluid flow entering and leaving the vortex.

The shunt flow path may be from the outer periphery of the vortex axially outward and then a radial inward spiral causing fluid to enter the vortex at or near its center. The shunt path may also be defined by devices separating it from the main and by-pass flows.

In vortex velocity flowmeter the vortex rate of rotation must bear a linear relation to the velocity of fluid flowing through the conduit. In order to achieve this relationship all three of these fluid flow systems must follow the same law that relates the pressure drop and flow of the three. To insure this relationship it has been found desirable to operate the flowmeter with all fluid flow systems above the critical Reynolds number.

The fluid properties determine the flow rate at which the three flows reach critical Reynolds number. Hence, the absolute value of the useful flow range is a function of fluid properties; namely, density and viscosity.

The vortex flow system is not a permanent cylinder of fluid as a pulley would be, but is rather a dynamic system in which new fluid continuously enters at the center and escapes in various ways at the periphery. In this way the vortex maintains its strength and stability. Too little replenishment of the vortex at its center causes it to lose strength and to shrink with the main flow expanding and engaging the rotor in paddle wheel fashion. Too much shunt flow into the vortex center causes an excessive radial velocity component which also engages the rotor blades in a paddle wheel fashion exemplified by the radial outflow turbine. Therefore, it is undesirable to have either too much or too little shunt flow.

In a vortex velocity flowmeter however a very small paddle wheel component of the radially outward type is desirable. The rotor within the vortex is so designed with respect to its radial function that very little torque is required to drive it. The small energy needed must, of course, be imparted to the rotor by relative motion of the vortex fluid. The relative motion, or slip, is of the order of 2 or 3% when it is tangential. This is undesirable because non-linearity over the useful flow range may approach a similar magnitude. In the present invention, structure is used to provide and control the radially outward flow that creates the necessary relative motion between fluid and rotor. Superimposing the radial flow on the vortex does not alter the linear relation between vortex and the adjacent stream lines of the main flow.

The shunt flow then must be sufficient to maintain the diameter of the vortex constant while supplying relative motion to turn the wheel and maintaining the vortex flow above the critical Reynolds number.

The invention herein disclosed has as its principal object the provision of improved means in a vortex velocity flowmeter for controlling the shunt flow in order to make the rate of rotation of the wheel into a linear function of the rate of flow in the conduit.

It is a further object of this invention to provide such means in a form which will allow it to be incorporated into vortex velocity flowmeters presently in use.

A vortex velocity meter embodying the invention, and the manner of using the same is described herein with references to the drawings, in which.

Figure 1:
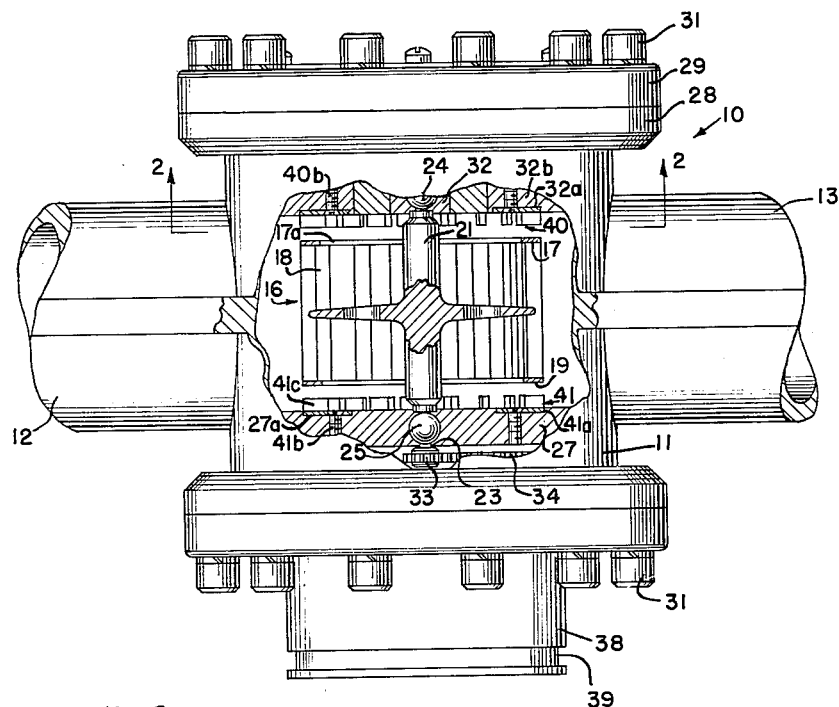
FIG. 1 is a plan view, partly broken away, of a vortex velocity flowmeter constructed in accordance with the teachings of this invention, illustrating in detail the vortex chamber, rotor and feeder plates.
Figure 2:
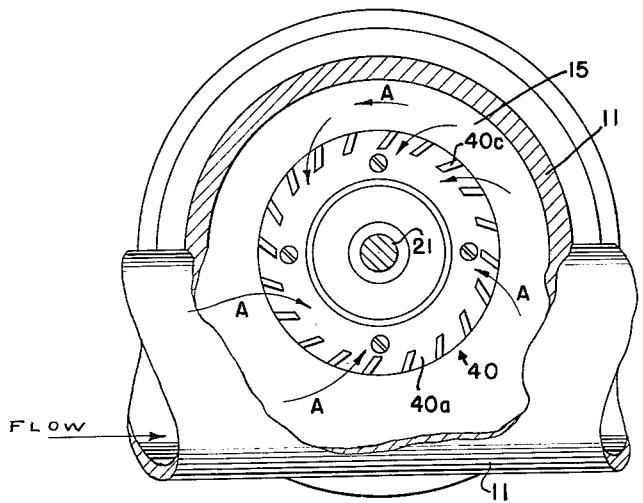
FIG. 2 is a partially sectional view taken along the line 2—2 in the direction of the arrows as indicated in FIG. 1, illustrating the feeder plate as viewed from the position of the rotor.

Referring to the drawings and specifically to FIGS. 1 and 2 thereof wherein is shown a flowmeter 10 which has been constructed in accordance with the teachings of U.S. Patent No. 2,906,121.

Flowmeter 10 is adapted to be coupled in a pipe line for the passage of fluid therethrough to be measured.

In the figures, the numerals 11, 12 and 13 are used to designate portions of the flowmeter shown therein. Thus, the numeral 11 designates the central or main conduit portion and numerals 12 and 13 designate respectively the inlet and outlet connections with conduit 11.

Mounted approximately at the geometric center of cavity 15 is a wheel or cage of the so-called squirrel cage type as indicated generally at 16. This wheel comprises a disk 17 forming one side thereof around which are disposed a plurality of blades 18 that are concavo-convex in cross section. The central portion of disk 17 to which the blades are attached can be cut away to provide circular central opening 17a so that disk 17 appears as a ring. At the opposite ends of the blades 18 they are connected together by ring 19 which can be identical with hollowed-out disk 17. Shaft 21 is provided for supporting cage 16 in rotatable fashion in the usual manner. Shaft 21 is supported in the flowmeter housing at one end through spherical bearing 24 and at the other end by spherical bearing 25. The spherical bearing 25 is mounted by suitable means in wall 27 of the conduit 11 and the side of the conduit opposite wall 27 is provided with an opening so that the cage readily can be mounted. This opening is defined by flange 28 which is integral with the conduit. Cover plate 29 is adapted to engage with flange 28 to which it is fastened by means of bolts 31. Centrally of the cover plate 29 is a sleeve bearing 32 which supports spherical bearing 24.

Pinion 33 which is mounted upon stem 23 of shaft 21 is adapted to motivate a gear train indicated generally at 34 which actuates, through a magnetic coupling, a counter mechanism of conventional type mounted on shoulder 38. The hub of the counter assembly includes pointed set screws which engage groove 39.

The description thus far has been confined to structure which is more specifically shown and described in aforementioned U.S. Patent No. 2,906,121. In this embodiment two feeder plates, one of which is indicated generally by the numeral 40 and the other of which is indicated by the numeral 41 in FIGS. 1 and 2, are provided for controlling the flow of fluid into and out of the vortex as will be described in detail below. As seen in FIGS. 1 and 2 feeder plate 40 consists of a flat circular ring 40a which is set in circular slot 32a formed in wall 32b which extends from bearing 32. Slot 32a is formed so as to receive ring 40a therein and maintain it in coaxial alignment with shaft 21. Ring 40a is held within slot 32a by screws indicated generally by the numeral 40b and the depth of slot 32a is approximately equal to the thickness of ring 40a. Ring 40a is provided with a plurality of blades indicated generally by the numeral 40c which project perpendicularly therefrom toward cage 16. All of the blades shown are identical and each is rectangular in construction having two parallel surfaces perpendicular with ring 40a. The number of blades and the shape of each blade must be selected for the particular result desired and therefore the number of blades and the configuration of blades can vary within the scope of this invention as will be explained below. For the moment, however, it is sufficient to realize that in the preferred embodiment each of the blades 40c as shown in FIG. 2 is the same distance from axis 21 or lying on the same circumference. It should also be noted that as shown in FIG. 2 each of the blades is spaced equally from adjacent blades and each of the blades forms the same tangential angle with the circumference upon which the blades lie.

It is therefore evident that the configuration and position of blades 40c can vary within the scope of this invention and it may be desirable for certain installations to utilize feeder plates having blades of a concavo-convex configuration identical with or complementing the blades of the vortex cage.

Feeder plate 41 as shown in FIG. 1 differs from feeder plate 40 only in that it is a mirror image thereof and is in all other respects identical to feeder plate 40. Thus, ring 41a of feeder plate 41 is maintained within circular slot 27a by means of screws 41b so that blades 41c project toward vortex cage 16.

The use of feeder plates in the vortex velocity flowmeter as shown in FIGS. 1 and 2 enables the designer to control the Reynolds number of the fluid which replenishes the vortex fluid which we have referred to as shunt flow. Consideration of the geometry of the path that the shunt flow takes and the geometry of the feeder plates described makes evident the manner in which such control is effected so that the shunt flow can be made to flow with a characteristic Reynolds number above the critical Reynolds number and thus have turbulent flow.

Consider the feeder plates shown in FIGS. 1 and 2. The Reynolds number of the path can be determined from the formula $$R = k\frac{Qp}{Du}$$

where Q indicates the rate of the shunt flow; $p$ the density of the fluid flowing; $u$ the viscosity of the fluid flowing and D the hydraulic diameter of the restriction presented by the feeder plate (proportional to ratio of flow area to wetted circumference). Of course $k$ is a characteristic constant.

Consideration of the formula for Reynolds number as set out above indicates that the Reynolds number of a given device is affected only by fluid properties. It also indicates that the only parameter which the designer can vary is the wetted circumference since the density and viscosity of the fluid are determined by the application and total flow area is determined by the shunt flow requirements.

Figure 3:
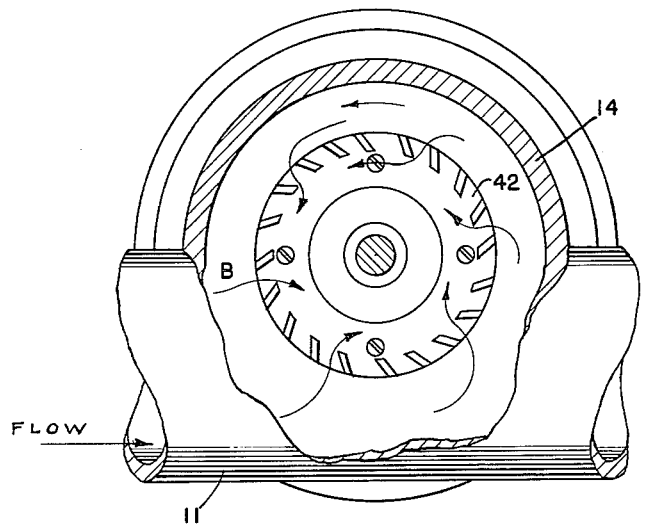
FIG. 3 is a view of the feeder plate as the rotor would see it similar to the view shown in FIG. 2, but with the feeder blades at angles inclined oppositely to the general direction of those in the rotor.

Hydraulic diameter, D, is conventionally calculated for non-circular cross-sections as $$D = \frac{4A}{C}$$

where A is flow area and C is wetted circumference. Effective flow area, hence also hydraulic diameter, can be decreased by decreasing feeder plate blade angle (where reverse is considered a logical decrease of angle from forward). FIG. 2 illustrates a feeder plate with forward blade angle in which flow from the counterclockwise circulation tends to utilize the full cross-section of each passage between the blades. FIG. 3 shows a reverse feeder plate in which the flow path is tortuous as indicated by the arrows. In the latter case the effective flow area is decreased and the critical Reynolds number is reached at a lower flow rate when the meter designer desires to match transition points occurring at lower flow rates in the other two flow paths.

With such a device the designer can change the critical Reynolds number by changing the magnitude of hydraulic diameter. When $u$ is large D must be made small, for example, to obtain a critical Reynolds number of suitably large magnitude.

For a given Reynolds number the fluid D can be varied independently of the absolute value of the shunt flow. In the equation set forth above D is the hydraulic diameter of a single passage in the shunt flow and Q is the flow through that single passage. Therefore, the total Q would be the summation of the individual Q's and the total D would be the summation of the individual D's. By consideration of the desired critical Reynolds number the designer can provide the correct shunt flow as well as the proper diameter for achieving the desired critical Reynolds number. In U.S. Patent No. 2,845,798 upon which the device considered here is an improvement, the designer was restricted in the range of operation due to the inability with the filler blade shown therein to supply the necessary shunt flow for maintaining the vortex and at the same time maintaining the shunt flow in the turbulent state. It is apparent, therefore, that the designer can achieve the objective by variation of the number, configuration or angle of the blades.

The arrows which have been designated in FIG. 2 with the letter A indicate generally the flow of shunt fluid resulting from use of feeder plates 40 and 41. In FIG. 3 a portion of a vortex velocity flowmeter is shown in which the feeder plates utilized have angles inclined oppositely to the angles of feeder plates shown in FIGS. 1 and 2. In FIG. 3, although only the feeder plate 42 is shown, a second feeder plate having a mirror image of the feeder plate 42 would be utilized so that the feeder plate 42 would take the position of feeder plate 40 in FIG. 1 and the second feeder plate which would be a mirror image of feeder plate 42 would take the position of feeder plate 41 in FIG. 1. With this exception the structure shown in FIG. 3 is identical with the structure shown in FIGS. 1 and 2. The direction of shunt flow achieved in the structure of FIG. 3 is indicated generally by the arrows labeled B.

Figure 4:
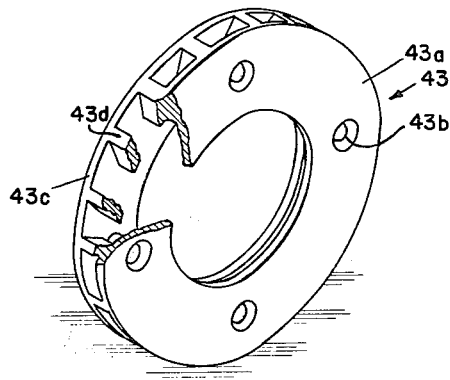
FIG. 4 is a perspective view with portions broken away of an alternate form of feeder plate.

In FIG. 4 an alternate configuration of feeder plate is shown. This feeder plate which is designated generally by the numeral 43 comprises rings 43a and 43c which is identical to the mounting rings of the feeder plates considered in FIGS. 1 through 3, and ring 43a having a central opening substantially smaller than the opening in ring 17 of the rotor. Ring 43a differs from ring 43c also in that ring 43a is provided with openings 43b to receive screws so that feeder plate 43 can be maintained in position within a flowmeter in the same manner as the previously described feeder plates. Between rings 43a and 43c blades 43d are provided with each plate having an end thereof integral with one of the rings and the remaining end integral with the remaining ring.

In use the feeder plate 43 would be fastened into the flowmeter of FIG. 1 to replace either plate 40 or 41 therein and a second feeder plate, not shown in the figures, having the mirror image of feeder plate 43 would be installed in the flowmeter in the same way that the second feeder plate described in connection with FIG. 1 would be installed.

Feeder plate 43 performs exactly the same function as that performed by the feeder plates previously constructed. The addition of a second ring, however, confines the shunt flow to a path between the blades and through the central opening in ring 43a toward the central opening in the vortex cage. The shunt flow must not only traverse the opening between blades, as previously described, but also must spiral inward to a smaller radius and go through a smaller opening to reach the vortex. Because of this specific path the feeder plate of FIG. 4 has been considered as having an orifice in series with the central opening in the vortex cage. It has been found that feeder plates of the type shown in FIGS. 2 and 3 are preferred for liquids and feeder plates of the type shown in FIG. 4 are preferred for gases.

Figure 5:
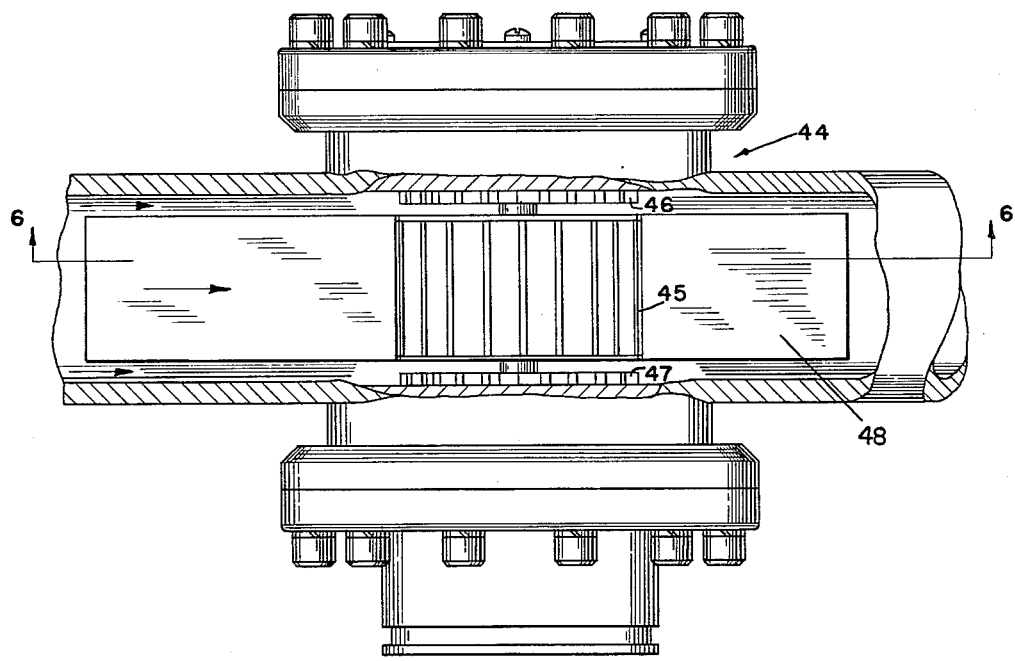
FIG. 5 is a plan view, partly broken away, of a vortex velocity flowmeter constructed in accordance with this invention provided with a hollow rectangular cross section septum for aiding in the separation of the various fluid flow paths.
Figure 6:
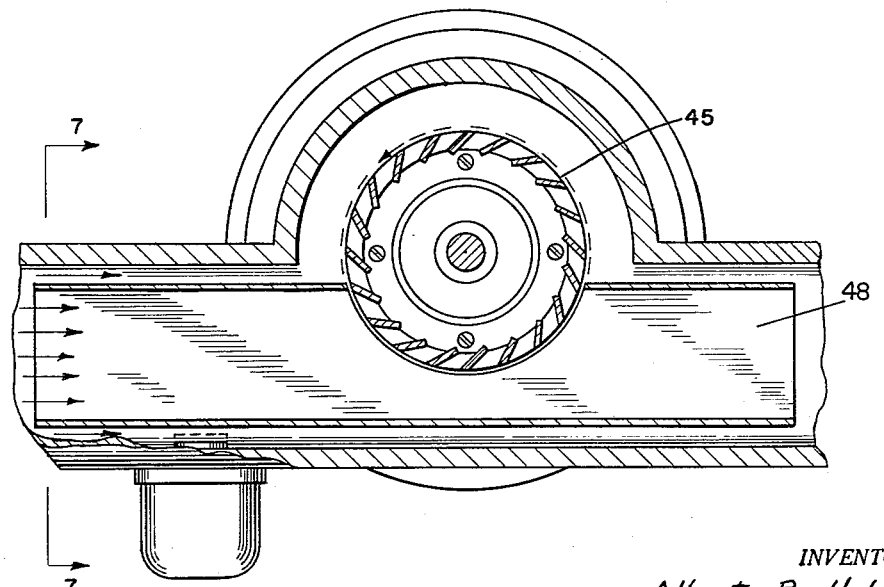
FIG. 6 is a partially sectional view taken along the line 6—6 in the direction of the arrows as indicated in FIG. 5 illustrating the feeder plate and a portion of the septum shown in FIG. 5 as viewed from the position of the rotor.
Figure 7:
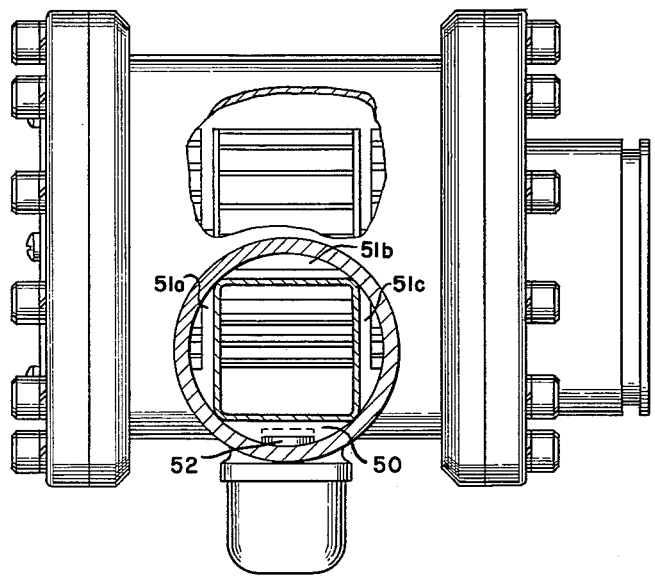
FIG. 7 is an end view of the vortex velocity flowmeter illustrated in FIG. 5 as viewed from the end with portions broken away to illustrate the cross section of the septum.
Figure 8:
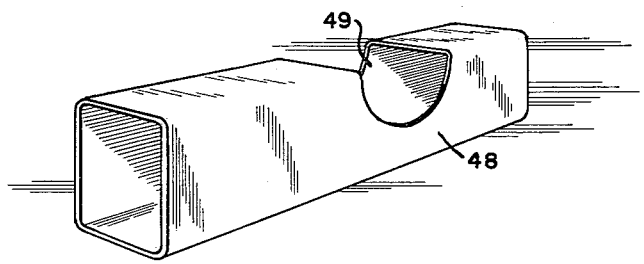
FIG. 8 is a perspective view of the septum used in the embodiment of the invention shown in FIGS. 5 through 7.

In FIGS. 5 through 8 vortex velocity flowmeter 44 is shown having a vortex cage 45 and feeder plates 46 and 47. Vortex cage 45 is generally identical to vortex cage 16 shown in FIG. 1. Feeder plates 46 and 47 shown in FIG. 5 are of the type feeder plates 40 and 41 shown in FIG. 1 but can be any of the other types described herein. The vortex velocity flowmeter illustrated in FIGS. 5 through 8 differs from the flowmeter shown in FIG. 1 in that the flowmeter 44 is provided with a constant diameter cross-section hollow septum 48 to provide controlled by-pass flow and shunt areas separated from the main flow path. The flow through the meter conduit is divided by septum 48. Septum 48 is disposed within the main flow path of flowmeter 44 as shown in the figures and provides a predetermined by-pass flow path. The flow is therefore divided as follows: main flow through the rectangular hollow passage, by-pass through segmental cross-section 50, FIG. 7, and shunt flow through segmental cross-sections 51a, 51b and 51c. An arcuate recess 49 is formed in the upper portion of septum 48 to provide space for a portion of vortex cage 45 when the flowmeter 44 is assembled and to provide communication between the main flow within the septum and the vortex which surrounds the vortex cage. The bypass flow through opening 50 is controlled by plug 52, as other throttling means, to effect calibration. The parallel shunt flows through openings 51a, 51b and 51c communicate with the space in which feeder plates and vortex cage are located. Separation of the three kinds of flow enable the designer to make maximum use of the feeder plates described herein.

The septum is a tight press fit in the meter bore and can be secured by tack weld if desired. Any suitable method of mounting may be utilized.

It is seen therefore that with this invention I have provided the designer of a vortex velocity flowmeter with means of controlling to a high degree of accuracy the critical Reynolds number of the shunt flow and when the remaining flows are operating above the critical Reynolds number the shunt flow can be enabled also to operate above the critical Reynolds number so that all of the flows obey the same hydraulic laws.

Thus, among others, the several objects of the invention as specifically noted above are achieved. Obviously, numerous changes in construction and rearrangement of the parts may be made without departing from the scope of the invention as defined by the claims.

I claim:
1. In a fluid flowmeter of the vortex-velocity type, a rigid casing, fluid flowing in said rigid casing, a vortex cage rotatably mounted in said rigid casing and rotated by said fluid flowing, an open end of said vortex cage, a feeder plate mounted in said casing adjacent said open end, blades formed on said feeder plate projecting toward said vortex cage, each of said blades being separated from adjacent blades, a shunt path for flow of fluid into said open end defined by the spaces between adjacent blades of said feeder plate and the hydraulic diameter of said shunt path being determined by the angles of the blades on said feeder plate.

2. The device of claim 1 in which the feeder plate has a flat surface thereof adjacent the open end of the vortex cage and the blades project from said flat surface and perpendicularly thereto.

3. The device of claim 2 in which the blades are disposed on a circumference and each is equally spaced from adjacent blades.

4. In a fluid flowmeter of the vortex-velocity type, a vortex cage mounted in a rigid casing, said vortex cage having at least one open end whereby shunt flow of fluid into said cage is established, a ring mounted in said casing adjacent said open end and spaced therefrom, a plurality of blades circumferentially arranged on said ring coaxially with said cage extending toward said vortex cage, said arrangement having approximately the same diameter as said cage and a second ring coaxial with said cage engaging the free ends of said plurality of blades and displaced from said vortex cage whereby the path for flow of fluid into said cage is defined by said blades and said second ring.

5. The device of claim 4 in which each of said blades is perpendicular to said rings and displaced from adjacent blades to allow for passage of fluid therebetween.

6. The device of claim 4 in which each of said blades forms the same tangential angle with said circumference.

7. The device of claim 6 in which each of said blades is equally displaced from adjacent blades.

8. In a fluid flowmeter of the vortex-velocity type having a main conduit, a vortex cage mounted in a rigid casing, said vortex cage having at least one open end whereby shunt flow of fluid into said cage is established, a feeder plate mounted in said casing adjacent said open end and spaced therefrom, blades formed on said feeder plate to define with said vortex cage a path for shunt flow of fluid into said cage and a hollow elongated member mounted within said main conduit for directing the flow of fluid to said feeder plate.

9. The device of claim 8 in which the elongated member is provided with an opening whereby a portion of the fluid flowing is directed toward the feeder plate.

10. The device of claim 9 in which the elongated member is of constant hollow rectangular cross-section and the opening through which the fluid is directed to the feeder plate is provided at a region between the ends of said elongated member.

11. The device of claim 9 in which means are provided for varying the quantity of fluid flowing through the elongated member.

References Cited in the file of this patent
UNITED STATES PATENTS

| | | |
|---|---|---|
| 336,147 | Nash | Feb. 16, 1886 |
| 1,235,559 | De Laval | Aug. 7, 1917 |
| 2,293,478 | Stevenson | Aug. 18, 1942 |
| 2,602,330 | Kollsman | July 8, 1952 |
| 2,845,798 | Knauth | Aug. 5, 1958 |
| 2,906,121 | Knauth | Sept. 29, 1959 |
| 2,949,764 | Knauth | Aug. 23, 1960 |